United States Patent [19]

Hosaka

[11] Patent Number: 4,688,107
[45] Date of Patent: Aug. 18, 1987

[54] INFORMATION RECORDING AND REGENERATING SYSTEM

[75] Inventor: Sumio Hosaka, Saitama, Japan

[73] Assignee: Pioneer Electronic Corporation, Tokyo, Japan

[21] Appl. No.: 716,994

[22] Filed: Mar. 28, 1985

[30] Foreign Application Priority Data

Mar. 30, 1984 [JP] Japan .................................. 59-62621

[51] Int. Cl.⁴ .............................................. H04N 5/76
[52] U.S. Cl. ................................................... 358/342
[58] Field of Search ....................... 358/342, 343, 907; 360/10.1, 19.1

[56] References Cited

U.S. PATENT DOCUMENTS 4,142,209  2/1979  Hedlund et al. ...................... 358/342
4,305,131 12/1981  Best ...................................... 358/342
4,308,557 12/1981  Dieterich ............................. 358/342
4,417,285 11/1983  Mes ...................................... 358/342
4,460,927  7/1984  Roméas ................................ 358/342
4,562,487 12/1985  Hurst, Jr. et al. ................... 358/342

Primary Examiner—Donald McElheny, Jr.
Attorney, Agent, or Firm—Finnegan, Henderson, Farabow, Garrett and Dunner

[57] ABSTRACT

A system for information recording and regenerating wherein a regeneration mode control signal is included in the horizontal scan of each frame of a video signal recorded on a video disk. The control signal includes a series of frame signal components and two field signal components associated with each frame signal component. The signal values of the frame and field signal components determine whether all or only selected video disk operations can be performed.

4 Claims, 12 Drawing Figures

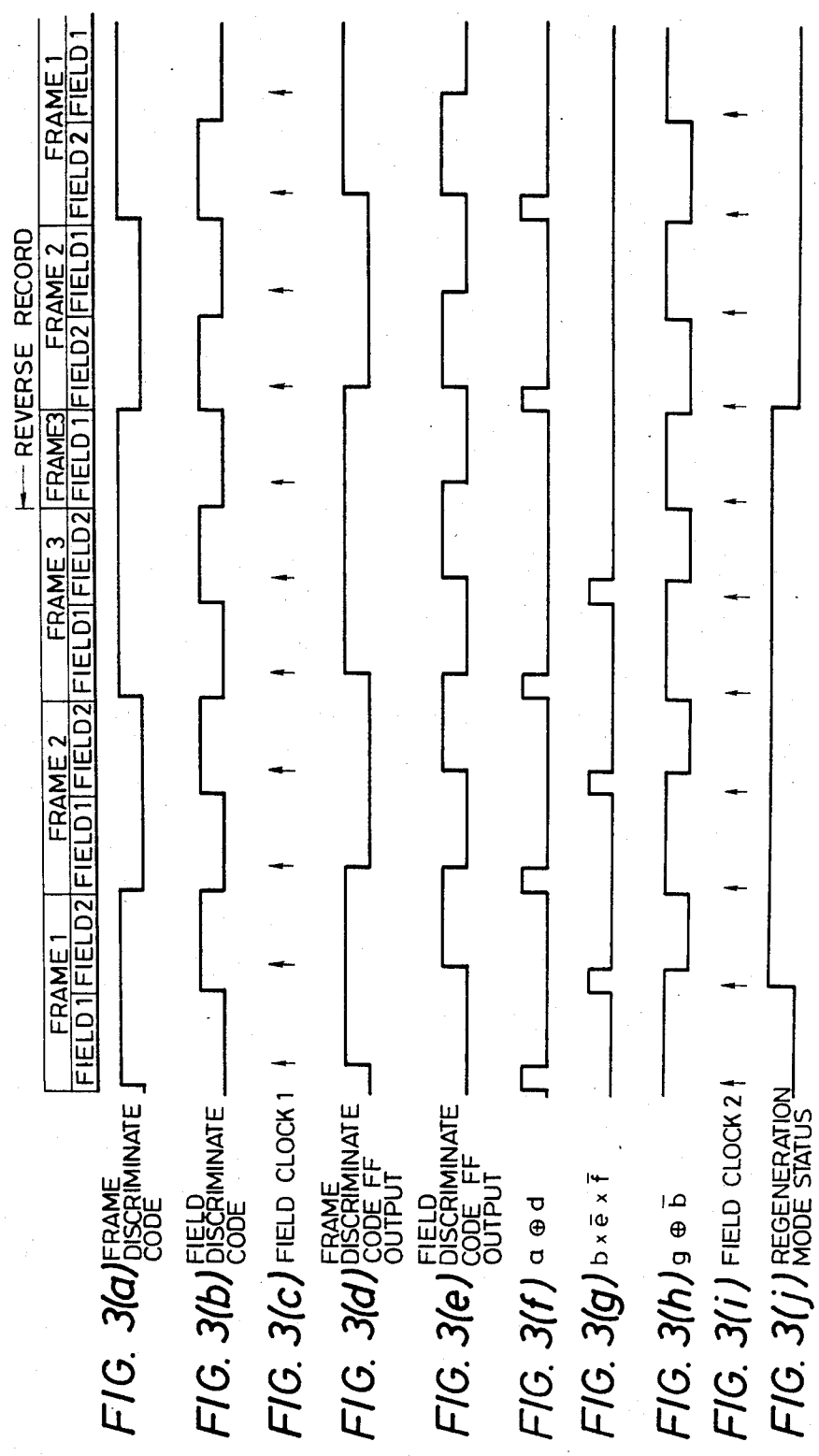

INFORMATION RECORDING AND REGENERATING SYSTEM

FIELD OF THE INVENTION

This invention relates to an information recording and regenerating system and more particularly to an information recording and regenerating system which contemplates automatically detecting the regenerative operation mode of a device for regenerating a video format signal recorded on a recording disk.

BACKGROUND OF THE INVENTION

A so-called SWS (Still With Sound) method has been proposed which comprises the steps necessary to record, on a recording disk, control information in addition to audio information digitized together with video information, and to regenerate at the time of the regenerative operation the audio information according to the control information. Thus, sound may be added to corresponding still image information. In this method, an adaptor has been developed in order that an ordinary VDP (video disk player) can be additionally provided with an SWS processor which regenerates and processes the audio information and the control data (hereinafter referred to as SWS data).

Since the SWS processor may properly read the SWS data if the VDP is in the normal regenerative mode, forward-framing regenerative mode, still image regenerative mode, or the like, it is sufficient for the SWS processor to carry out signal processing according to the content of properly read data. However, the SWS processor is not able to read the SWS data properly when the VDP is in certain specific regenerative modes such as reverse regenerative mode, fast-forward regenerative mode, or the like. Therefore, data must not be sent to the control circuit during any of the latter specific regenerative modes. Accordingly, a circuit configuration is required which enables the SWS processor to automatically discriminate the current VDP operation mode.

OBJECTS AND SUMMARY OF THE INVENTION

The present invention achieved in view of these requests, aims to provide a recorded information regenerating system to enable the automatic discrimination of the VDP regenerative operation mode according to a regenerative signal read by and received from the VDP.

Another object of the present invention is to enable implementation of the SWS mode in a manner not hindered by operation in a specific regenerative mode.

The recorded information regenerating system according to the present invention comprises the method and apparatus for recording on a recording medium a video format signal including frame discriminate code data that are different from each other in adjacent frames and field discriminate code data that correspond to the fields included in each frame and for discriminating the regenerative operation mode at the time of the regeneration according to the contents of the frame and field discriminate code data.

BRIEF DESCRIPTION OF THE DRAWINGS

The manner by which these and other objects, features, and advantages of the present invention are achieved, as well as the invention itself, will become more apparent from the following detailed description when considered in view of the accompanying drawings, wherein:

FIGS. 3(a)–3(j) are waveform diagrams of signals generated by the elements of the circuit of FIG. 1.

DETAILED DESCRIPTION

Figure 1:
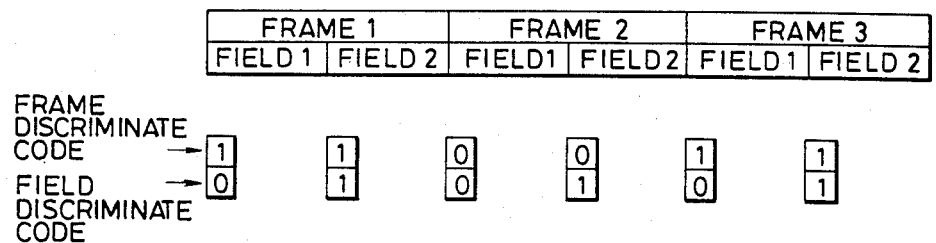
FIG. 1 illustrates a video format signal including frame discriminate code data and field discriminate code data recorded on a recording disk processed by the method of the present invention.

FIG. 1 shows an example of a video control signal including frame discriminate code data and the field discriminate code data to be recorded on a recording disk according to the present invention. Each of these codes is a 1-bit data element which is inserted and recorded in the specific horizontal scanning duration of each field of the video format signal. The frame discriminate code data are recorded so that the code values are different from each other in adjacent frames and the field discriminate code data are recorded so that the code values in the first field and the second field are different from each other.

Figure 2:
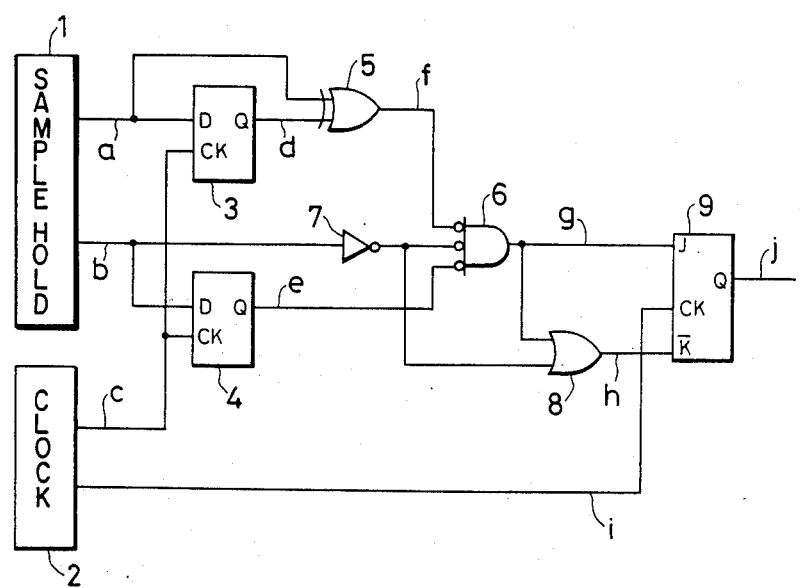
FIG. 2 is a circuit block diagram of an embodiment of a circuit for processing the video format signal of FIG. 1.

FIG. 2 shows an embodiment of the regenerative system in the case of the discrimination of the VDP regenerative operation mode using the code information shown in FIG. 1. A code read circuit 1 reads the frame discriminate code data and the field discriminate code data from the regenerated output of the VDP and holds these data until the next field discriminate code data is read. A timing signal generating circuit 2 generates two trains (c and i) of cyclic pulses for each field in order that the rising edges of each pulse are used as a clock signal for flip-flops (FF) 3, 4 and 9. A pair of D-FFs 3, 4 latch the input signal at the rising edge of the clock signal. An exclusive OR gate 5, a three-input NAND gate 6, an inverter 7, an OR gate 8, and a J-K FF 9 are also provided. The J-K FF 9 reads the input signals at the rising edge of the clock signal.

FIGS. 3(a)–3(j) are operation timing diagrams for the circuit in FIG. 2 and show the waveforms corresponding to the signals a through j, respectively. The frame discriminate code data a and the field discriminate code data b are latched by FFs 3 and 4, respectively, at the rising edge of the clock signal c for each field and converted into the signals d and e, respectively. The exclusive OR of the frame discriminate code data "a" and the latch output d of the field discriminate code data FF 3 is generated by the gate 5 to produce the signal f. That is, the signal f becomes a positive pulse at the start of each frame.

The signal g is obtained by entering the inverted signal b and the signals f and e into the NAND gate 6, and it becomes H (high level) only when the signal b is H, the signal f is L (low level) and the signal e is L. That is, the signal g becomes H within the duration of the second field only while the frame discriminate code data "a" remains unchanged with associated the field discriminate code data "b" being first L and then H.

The signal h is a logical sum of the inverted signal b and the signal g and it is H within the first field duration and when the signal g is H. The signal j, indicatingg the regenerative operation mode, is obtained by entering the signal g and the signal h into the J-K FF 9 and latching them with the clock signal i for each field. It should be assumed, however, that the rise of the clock signal i is between the change timing of the field discriminate code data and the rise of the clock signal c. In addition, it is assumed that the Q output signal of the J-K FF 9 becomes H when the J and K input signals to the J-K FF 9 are all H, it becomes L when the J and K input signals are all L, and it remains unchanged when the J input signal is L and the K input signal is H.

The condition under which the signal j is set to H occurs when the signals g and h are all H, that is, the signal j is set to H only when the signals f and e are all L and the signal b is H. In other words, the above condition occurs when there is no frame change at the time of the field shift from the first field to the second field. Under this condition, it is detected that the VDP is in the normal regeneration mode and not in the specific regeneration mode such as the reverse regeneration mode or the like.

The conditions under which the signal j is reset to L occurs when the signals g and h are all L, that is, the signal j is reset to L when a frame change occurs at the time of the field shift from the first field to the second field. In this case, it is detected that the VDP is in an operation mode such as the reverse regeneration mode, fast-forward mode, or the like.

It would be understood from the embodiment that the discrimination of the VDP operation is enabled automatically by monitoring the signal j.

As set forth hereinabove, since the discrimination of the VDP operation mode is enabled automatically by the regeneration signal from the VDP according to the present invention, the discrimination in the case of an SWS processor connected to the VDP is enabled automatically at the SWS processor side. In addition, in the SWS processor, although an SWS data-inserted part in the regenerated video format signal is mask-processed to the black level, for example, and then sent out to the monitor, this detected signal may also be used for the purpose of preventing erroneous mask-processing while the VDP is in the specific operation mode.

What is claimed is:

1. A device for producing a first control signal adapted for controlling the operation of a video disk player to inhibit certain operations thereof if the disk player is in one of a first set of predetermined regeneration modes or a second control signal adapted for controlling the operation of the video disk player to enable the certain operations, thereof if the disk player is in one of a second set of predetermined regeneration modes, the device being adapted to receive a video signal including a regeneration control signal having a series of frame signal components and first and second field signal components associated with each of the frame signal components, each of the frame signal components and the field signal components having a first signal value or a second signal value, the device comprising:

means adapted for receiving the video signal and for outputting a frame signal component separately from the first and second field signal components associated therewith;

first means, coupled to said receiving means and receiving said frame signal components therefrom, for determining if successively received frame signal components have different signal values;

second means, coupled to said receiving means and receiving said first and second field signal components therefrom, for determining if said first and second field signal components associated with one of said frame signal components have said first signal value and said second signal value, respectively; and means, coupled to said first means and said second means, for generating said first control signal if one of said frame signal components is determined to have said first value and the second field component associated with said one frame signal component is determined to have said first value, and said second control signal if the transition from one of said frame signal components having said first signal value to the next succeeding frame signal component having said second signal value occurs at the time of a transition from said first field component associated with said one frame signal component to said second field component associated with said next succeeding frame signal component.

2. A device according to claim 1, wherein said first determining means comprises:

an exclusive OR gate having a first input terminal for successively receiving said frame signal components from said receiving means, a second input terminal, and an output terminal; and a first delay circuit having an input terminal for successively receiving said frame signal components from said receiving means and an output terminal connected to said second input terminal of said exclusive OR gate, said first delay circuit for providing a frame signal component to said second input terminal of said exclusive OR gate simultaneously with said first input terminal of said exclusive OR gate receiving the next successive frame signal component, said exclusive OR gate outputting at said output terminal thereof a frame comparison signal having said first signal value if said frame signal components received by said first and second input terminals of said exclusive OR gate have the same signal values and a second signal value if one or both of said frame signal components received by said first and second input terminals of said exlusive OR gate have different signal values.

3. A device according to claim 2, wherein said second determining means comprises:

a NOR gate having a first input terminal for receiving said frame comparison signal, a second input terminal, a third input terminal, and an output terminal;

an inverter having an input terminal for receiving said field signal components from said receiving means and an output terminal connected to said second input terminal of said NOR gate; and a second delay circuit having an input terminal for receiving said field signal components from said receiving means and an output terminal connected to said third input terminal of said NOR gate to supply to said third input terminal the first of said two field signal components associated with one of said frame signal components simultaneously with the supply to said second input terminal of said NOR gate of the second of said two field signal components associated with said one frame signal component, said NOR gate outputting a regeneration mode signal having (1) said first value if successive frame component signals have the same signal values, if said first field signal component associated with one of said frame component signals has said second signal value or if said second field signal component associated with one of said frame component signals has said second signal value, and (2) said second value if successive frame component signals have different signal values and if said first field signal component associated with one of said frame component signals has said first signal value while said second field signal component associated with said one frame component signal has said second signal value.

4. A device according to claim 3, wherein said generating means comprises:

an OR gate having a first input terminal connected to said output terminal of said NOR gate, a second input terminal connected to said output terminal of said inverter, and an output terminal; and a J-K flip-flop having a J input connected to said output terminal of said NOR gate, a K input connected to said output terminal of said OR gate, and an output terminal for outputting said first control signal adapted for inhibiting said certain operations of the video disk player responsive to said NOR gate and said OR gate outputting respective signals having said first signal value or said second control signal to enable said certain operations of the video disk player responsive to said NOR gate and said OR gate outputting respective signals having said second signal value.

* * * * *